Figure 1:
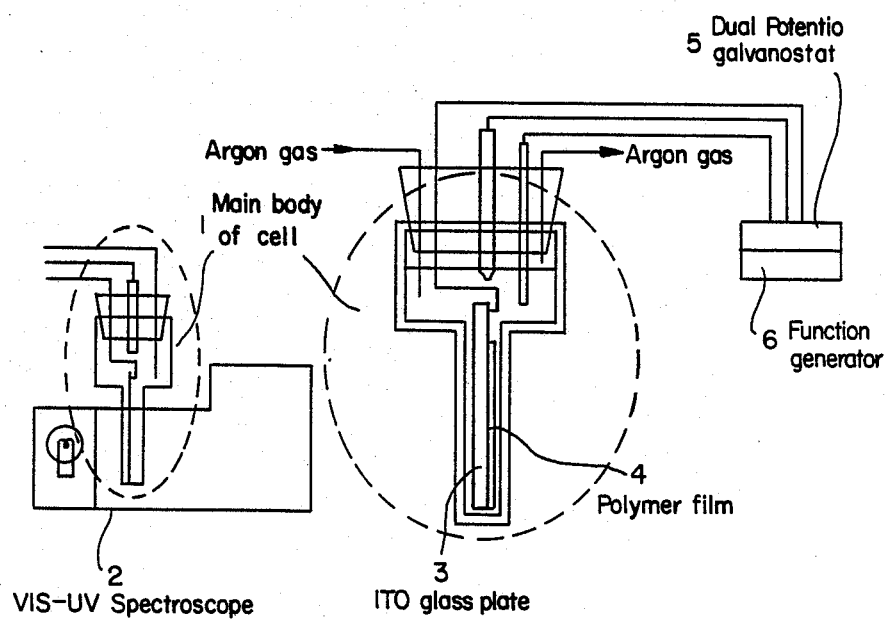

United States Patent [19]

Shimizu et al.

[11] Patent Number: 4,816,536
[45] Date of Patent: Mar. 28, 1989

[54] POLYMERS OF 3,4-SUBSTITUTED PYRROLE COMPOUNDS AND THEIR PREPARATION METHOD

[75] Inventors: Takeo Shimizu, Uzi; Takehira Kaneko, Kyoto; Tomoyuki Inoue, Chiba; Hiroshi Takahashi, Chigasaki, all of Japan

[73] Assignee: Nippon Soda Co., Ltd., Tokyo, Japan

[21] Appl. No.: 36,670

[22] PCT Filed: Aug. 4, 1986

[86] PCT No.: PCT/JP86/00399
§ 371 Date: Apr. 27, 1987
§ 102(e) Date: Apr. 27, 1987

[87] PCT Pub. No.: WO87/00843
PCT Pub. Date: Feb. 12, 1987

[30] Foreign Application Priority Data

Aug. 6, 1985 [JP] Japan .................. 60-171837
Feb. 25, 1986 [JP] Japan .................. 61-38281
May 6, 1986 [JP] Japan .................. 61-102133

[51] Int. Cl.$^4$ ........................... C08F 226/06
[52] U.S. Cl. .................. 526/258; 526/243; 526/247; 526/252; 548/518
[58] Field of Search ........... 526/258, 247, 243, 252; 548/515

Primary Examiner—C. Warren Ivy
Assistant Examiner—Alex H. Walker
Attorney, Agent, or Firm—George B. Oujevolk

[57] ABSTRACT

Polymers of a 3,4-substituted pyrrole compound substituted by an electron-attractive group having a Hammett's substituent constant ($\sigma_p$) of 0.30 to 0.80 in at least one of the 3- and 4- positions are disclosed. The polymers are stable in the air in a dope-free state and show distinct electrochromism. Some of them are soluble in an alkaline aqueous solvent. Therefore, they are useful as electrochromic elements, etc.

4 Claims, 4 Drawing Sheets

POLYMERS OF 3,4-SUBSTITUTED PYRROLE COMPOUNDS AND THEIR PREPARATION METHOD

TECHNICAL FIELD

This invention relates to new polymers of pyrrole compounds and more particularly to the polymers of 3,4-substituted pyrrole compounds, their preparation method and the laminates of the polymer on an electrode plate.

BACKGROUND TECHNOLOGIES

The electrochemical polymerization of 5-membered and 6-membered heterocyclic compounds, particularly of pyrrole, is laid open in the specification of U.S. Pat. No. 3,574,072.

That the anodic oxidative polymerization of pyrrole in the presence of a conductive salt results in forming film with the conductivity of less than $10^2 S\ cm^{-1}$ on the anode is described in A. F. Diaz, et. al: J.C.S. Chemical Communication (J.C.S. Chem. Comm. P635 (1979)).

It is defined in this technical field that polymer film containing the anion of the conductive salt and formed on the anode is said to be doped in the P type (oxidation state) and the state of which the anion, a dopant, is taken out from the inside of the molecule is said a undoping state (reduction state). The polymer film is known to have high conductivity in the doping state and extremely low conductivity in the undoping state, and to display the electrochromism when changing between the two states.

The polymers of 3,4-substituted pyrrole, especially of 3,4-asymmetrically substituted pyrrole compounds have general descriptions but few of them have been synthesized. No documents describing particularly polymers of pyrrole compounds having an electron attractive substituent at $C_3$ or $C_4$ have not been yet known.

The aforementioned polymer film of pyrrole compounds display the electrochromism, and have however no clear beautiful color changes. When letting stand alone in the air in the undoping state, the film is oxidized to change the color to black and thus does not exist stable in the undoping state. The polymers are usually insoluble and not melting.

Therefore, industrially useful materials or electronic devices employing the film have not been obtained yet.

INDICATION OF INVENTION

The present invention aims at offering the new polymers of 3,4-substituted pyrrole compounds, which have clear color changes and exist stable in the air even in the undoping state, and their preparation methods.

This invention has particular purposes of offering the polymers of 3,4-asymmetrically substituted pyrrole compounds and the polymers soluble in alkaline aqueous solvents, among the above polymers.

In addition, an offer of the laminates made by laminating the film of the said polymer on an electrode plate and applicable as electro chromic components is also one of the purposes of the invention.

This invention relates to that a pyrrole compound represented by the following general formula (1)

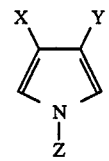

(where at least one of X and Y is an electron attractive substituent with 0.30–0.80 of the Hammett's substituent constant ($\sigma p$), and if only one of X and Y is the above electron attractive substituent, the other is hydrogen, an alkyl radical, a benzyl radical, or a non-substituted or substituted phenyl radical, and Z is hydrogen or an lower alkyl radical) is polymerized by electrolytic oxidation in the presence of a conductive salt, or by chemical oxidation in the presence of an oxidizing agent, resulting in giving the polymers of 3,4-substituted pyrrole compounds, which are represented by the following general formula (2)

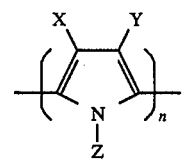

(where X, Y and Z have the same meaning as the above and n is an integer of 2 or larger).

In this invention, the pyrrole compound used as a material and its polymer have, as depicted in general formulae (1) and (2), at least an electron attractive substituent with the Hammett's substituent constant ($\sigma p$) within the range of 0.3–0.80 at $C_3$ or $C_4$. The substituent includes $NO_2$, $-SO_2NH_2$, $-CF_3$, $-OCF_3$, $-SCF_3$, $-CN$, $-NCS$, $-CHO$, $-COOH$, $-CH_2COOH$, $-CONH_2$, $-CONHOH$, $-SOR$, $-SO_2R$, $-OSO_2R$, $-CF_2CF_3$, $-COR$, $-SCOR$, $-OCOR$, $-COOR$, $-CONHR$, $-CHNOR$, $-CHNNHC(S)NH_2$, $-P(R)_2D$, $(O)(OR)_2$, $-C(OH)(CF_3)_2$, $-N_2C_6H_5$, $-SO_2C_6H_5$, $-OSO_2C_6H_5$, $-COC_6H_5$, $-CO_2C_6H_5$, $-CHNC_6H_5$ or $-P(O)(C_6H_5)_2$ (where R stands for a straight chain or branched alkyl radical having from 1 to 10 carbon atoms). Particularly preferred one includes $-COOH$, $-COOR$, $-NO_2$, $-CN$, $-COR$, $-CONH_2$ or $-CONHOH$ (where R is a straight chain or branched alkyl radical having from 1 to 10 carbon atoms).

These various compounds can be used singly or as a mixture, as the material pyrrole compound.

Of the above pyrrole compounds and their polymers, those of which only either $C_3$ or $C_4$ is substituted by one of the above electron attractive group are said to be 3,4-asymmetrically substituted pyrrole compounds and their polymers. In this case, the other position of $C_3$ or $C_4$ has hydrogen, a straight-chain or branched alkyl radical having from 1 to 10 carbons, a benzyl radical, a phenyl radical or a phenyl radical substituted by a halogen, nitro, cyano, methoxy or ethoxy radical.

Of the above polymers, those of which at least one of X and Y is an acid substituent such as $-COOH$ or $-CH_2COOH$ (if only one of them is the stated acid substituent, the other is hydrogen, an alkyl radical having from 1 to 3 carbons or a phenyl radical) are soluble in alkaline aqueous solvents.

In addition, the polymers of the 3,4-substituted pyrrole compounds of this invention can form film on an electrode plate to be laminates.

BRIEF DESCRIPTION ON DRAWINGS

FIG. 1 shows the instruments used for the measurement of electrochromic properties.

(Symbols used)
1. Main body of cell
2. VIS-UV spectroscope
3. ITO glass plate
4. Polymer film
5. Dual potentio galvanostat
6. Function generator FIGS. 2(a) and (b) depict the wavelength-absorbance curves representing the electrochromic properties of the polymer film of the 3,4-asymmetrically substituted pyrrole compounds, which is obtained in Example 1. The numerals affixed to each curve stand for voltage ($\times 10^{-1}$V).

Figure 3A:
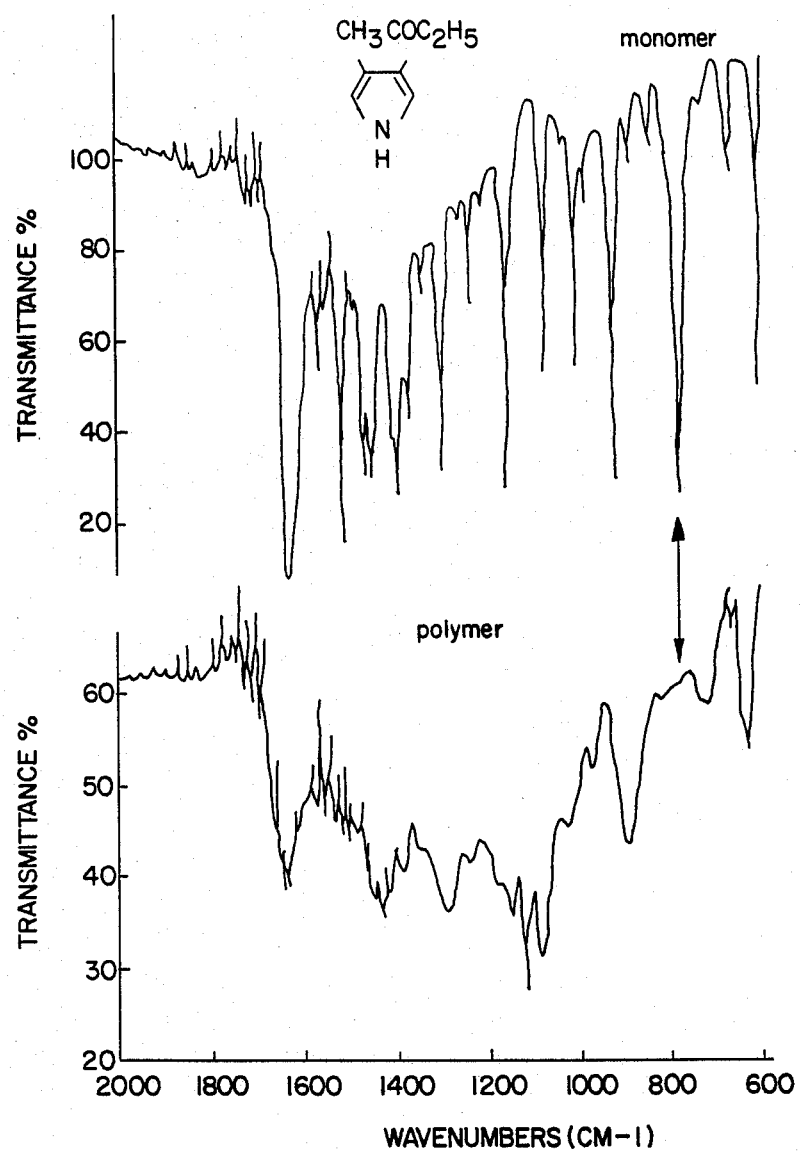
Figure 3B:
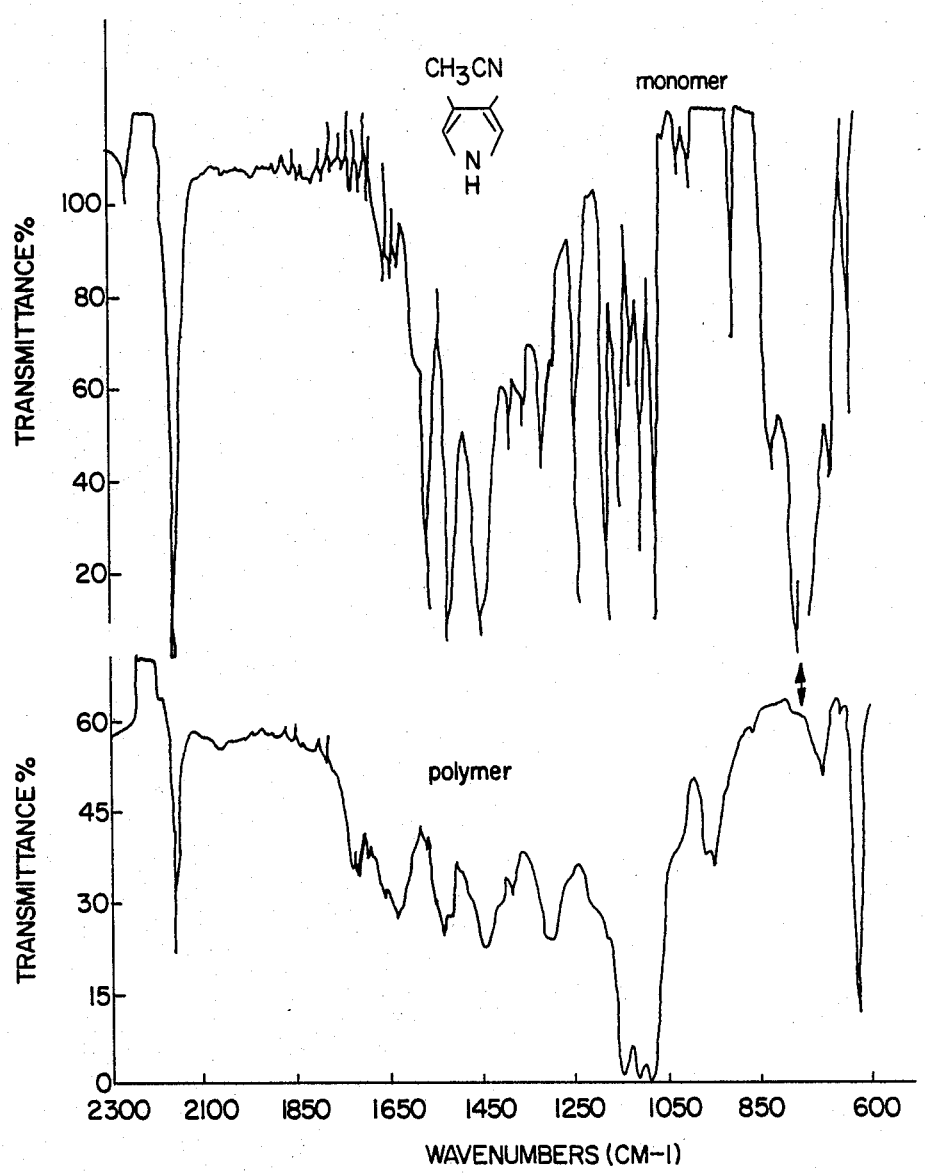

FIGS. 3(a) and (b) show the IR absorption spectra of the monomers of Samples 1-6 and 1-7 used in Example 1 and formed polymers, respectively.

MOST SUITABLE FORMS FOR EXECUTION OF INVENTION

In the method for the preparation of the polymer represented by the aforementioned general formula (2) by the electrochemical polymerization of this invention, the conductive salt used is a salt made by (a) at least a cation selected from the group consisting of $H^+$, $Li^+$, $Na^+$, $K^+$, $R'_4N^+$ and $R'_4P^+$ (where R' is hydrogen atom, an alkyl radical, a cycloalkyl radical or aryl radical with no mutual relation) and (b) at least an anion selected from the group consisting of $BF_4^-$, $AsF_4^-$, $AsF_6^-$, $SbF_6^-$, $SbCl_6^-$, $PF_6^-$, $ClO_4^-$, $HSO_4^-$ and $SO_4^{2-}$.

In the said method, a solution of which 0.001-1 Mol/l of the above conductive salt is dissolved is used as an electrolyte, to which 0.001-1 Mol/l of the 3,4-substituted pyrrole compound represented by the aforementioned general formula (1) is added, d.c. current is applied to deposit the polymer represented by the aforementioned general formula (2) on the surface of the anode, and the polymer grows to be film.

A solvent for the electrolyte can be any which can dissolve the 3,4-substituted pyrrole compound represented by the aforementioned general formula (1), and applicable solvents include organic solvents such as acetonitrile, benzonitrile, propylene carbonate, dimethylformamide, tetrahydrofuran, nitrobenzene, methylene dichloride, chloroform or ethylene dichloride, water, or their mixtures.

Such employed conditions as the type of conductive salt and solvent, applied current or voltage may differ depending on the type of 3,4-substituted pyrrole compound of material used.

In the method for the preparation of the polymer represented by the aforementioned general formula (2) by the chemical oxidation method, the oxidizing agent used has no particular limitations, if having oxidation potential higher than that of the material 3,4-substituted pyrrole compound, and includes a strong oxidizing agent such as $Fe^{3+}$ compounds, $H_2O_2$, $S_2O_8^{2-}$ compounds, $Cl_2$ or $Br_2$, highly oxidized oxy acid ion donating compounds such as $RuO_4^-$ compounds, $OsO_4^-$ compounds or $MnO_4^-$ compounds, or noble metal acid ion donating compounds such as $IrCl_6^{2-}$ compounds, $PtCl_6^{2-}$ compounds, $PdCl_4^{2-}$ compounds or $AuCl_4^{2-}$ compounds. Such compounds as ruthenium (III) tris (batho phenanthroline sulfonic acid) and ruthenium (III) tris (bipyridinc sulfonic acid) are preferred examples in particular.

In the chemical oxidation method, the reaction can be carried out either in a solvent system or in a non-solvent system. The polymer is directly obtained in the form of powder or solid film.

Any solvents, which do not react with the oxidizing agent, can be used as reaction solvents with no particular limitations. The preferred are water, lower alcohols, acetonitrile, chloroform, or their mixtures.

In the solvent system reaction, the material pyrrole compound and oxidizing agent have no particular limitations on concentration, and can be reacted within a range of 0.001 mol/l to saturated solution, respectively.

In the polymers obtained in the methods mentioned above, the anion species of the conductive salt or oxidizing agent, which is used in the reaction, are doped.

Of the polymers of this invention, particularly the polymers of pyrrole compounds, which are asymmetrically substituted at $C_3$ and $C_4$ and have an electron attractive radical at one of the positions, have oxidation-reduction potential fairly greatly shifted to the positive side, compared with other pyrrole compounds. The potential is relatively different from the oxidation-reduction potential of oxygen or water. As a result, the polymers are stable in the air and display clear electrochromism.

If the Hammett's substituent constant ($\sigma p$) of the electron attractive group is less than 0.30, the oxidation-reduction potential of the polymer becomes close to that of oxygen or water and the polymer is not stable in the air in the undoping state. If the constant exceeds 0.80, the polymerization becomes hard to carry out, and thus usable polymers cannot be produced with good reproducibility.

Of the polymers of this invention, the polymers of pyrrole compounds, at least one of whose substituents at $C_3$ and $C_4$ is an acid group such as —COOH or —CH$_2$COOH (if only one of them is the stated substituent, the other is hydrogen, an alkyl radical having from 1 to 3 carbon atoms, or a phenyl radical), have a characteristic of being soluble in alkaline aqueous solvent. This is considered to be attributable to the acid group in the polymer.

A preferred alkaline reagent used to dissolve the polymers soluble in an alkaline aqueous solvent includes an alkaline metal hydroxide such as Li, Na, K, Cs or Rb, an ammonia or tetra alkyl ammonium hydroxide aqueous solution, or an alcoholic aqueous alkaline solution. The amount of the reagent used should be larger than the neutralization equivalent of the acid group of the polymer.

The concentration of the polymer in the dissolving solution can be arbitrarily adjusted unpending on the application purposes. The neutratization or acidification of the dissolving solution results in reproducing the polymer of the undoping state in the form of powder or solid film. Thus, the polymer can be changed to the doping state electrochemically or chemically by a known method.

The molecular weight distribution of the dissolving solution can be measured by gel-permeation chromatography (GPC).

The molecular weight distribution of the polymer obtained by the oxidative polymerization can be changed by such conditions as electrolysis temperature, anodic current density or monomer concentration. In the present invention, polymer whose weight average molecular weight is 1,000 to 1,000,000, particularly 1,000 to 100,000, is preferred. Polymers of less than 1,000 of the weight average molecular weight are not favorable because of inferior properties. If the weight average molecular weight exceeds 1,000,000, the polymers are not also favorable because of difficult handling due to high viscosity. The molecular weight is impossible to be indicated for the pyrrole polymers insoluble in alkaline aqueous solvent because of difficult molecular weight measurement.

This invention relates to the laminates made by forming the aforementioned polymer film on electrode plates.

For the said laminates, various types of metal or glass plates, on which conductive film such as ITO (indium oxide with doped tin) film or NESA (tin oxide in which such element as antimony is doped) film is formed, can be used as electrodes.

In the method for the preparation of polymer by the aforementioned electrolytic oxidation method, the employment of an electrode on which the polymer film is to be formed as an anode allows to form the polymer film on the said anode for easily obtaining the laminate.

Of the polymers obtained by the chemical oxidation method, if polymer insoluble in solvent is used, the laminate can be produced in such a method that the stated polymer is pressure molded to film to pressingly adhere on an electrode plate via conductive paste or the polymer is compression molded directly on an electrode plate on which conductive paste is applied.

A polymer substance with ability to form film and an oxidizing agent are solved in a common solvent and cast on an electrode in order to form film. The vapor of a pyrrole compound used as a material is made contact with the obtained cast film to react to produce the laminate.

Compared with this, polymer soluble in alkaline aqueous solvent can be applied or printed on the conductive surface of e.g. a metal plate or transparent conductive glass. The applied surface is dried and then kept in an acid gas atmosphere, resulting in forming semiconductor film insoluble in solvent. The film can be doped by a known method for converting to the laminate.

The obtained laminate is stable in the air, and displays clear electrochromism when changed between the doping state (oxidation state) and the undoping state (reduction state).

The polymer soluble in alkaline aqueous solvent can be applied or printed on or penetrated into an insulating substrate of plastic or ceramic. The semiconductor film insoluble in solvent, which is obtained in a similar manner to the above, is difficult to be doped electrochemically, and is thus doped chemically with e.g. iodine ($I_2$) vapor for converting to the laminate.

As mentioned above, the employment of polymer soluble in alkaline aqueous solution allows to form conductive film on desired substrate surface with desired pattern. This invention has the effect as this. In addition, the conductive film produced from the polymer, thanks to the possession of an acid group capable of using as a reaction active site in every repeated unit, can be chemically reacted with other function generating reagents.

EXAMPLES

The invention is further illustrated by reference to the following examples. The range of the invention is not limited by the following examples.

EXAMPLE 1

Electrochemical polymerization and preparation of laminates

Sample 1-1.

An ITO coated glass (4 $cm^2$) used as an anode, and a platinum and a KCl saturated calomel electrodes employed as a cathode and a reference electrode, respectively, were set in an electrolytic cell of 100 ml in capacity. Purified methyl, 4-methylpyrrole-3-carboxylate of 348 g ($2.5 \times 10^{-3}$ mole) and tetrabutyl ammonium perchlorate of 0.855 g ($2.5 \times 10^{-3}$ mole) were dissolved in 50 ml of acetonitrile to use as an electrolyte, which was placed in the cell.

Nitrogen gas was introduced into the electrolytic cell for eliminating air, and a constant current of 1.0 mA was applied for 40 seconds to obtain a laminate (Sample 1-1) of which red polymer film was formed on the surface of the ITO coated glass of the anode.

The pyrrole compound used as a material and the obtained polymer film were measured for the following characteristics.

The measured results are shown in Table 1.

(a) Oxidation potential of material pyrrole compound

Measured by using a dual potentio-galvanostat (OPGS-1)-function generator (Nikko Keisoku Co.) and an XY recorder.

(b) Polymer film conductivity measurement

Carried out by 4 probe method according to Van der Pauw.

(c) Oxidation reduction potential of polymer film

Measured by using the same measuring instruments used for the above oxidation potential measurement of the material pyrrole compound.

(d) Electrochromic properties of polymer film

A device shown in attached FIG. 1 was used. The voltage was manually changed by 100 mV, and, when the current valve of the potentiostat became nearly constant, a UV chart was drawn for the absorbance (between 350–750 nm), in order to indicate the relationship between the wavelength and absorbance.

Figure 2A:
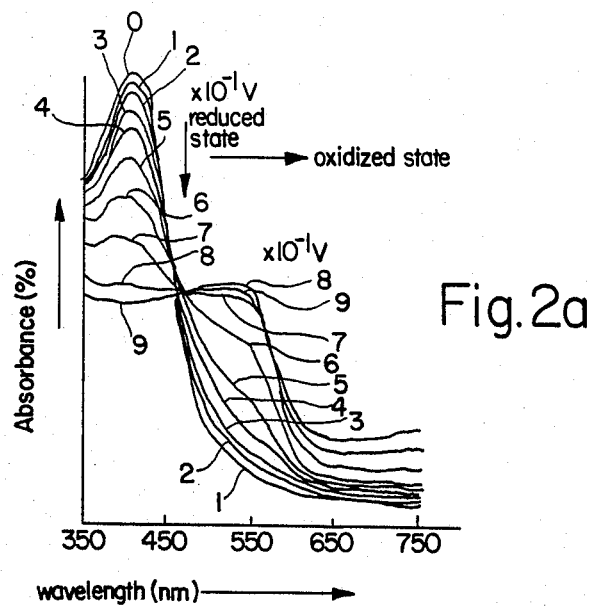
Figure 2B:
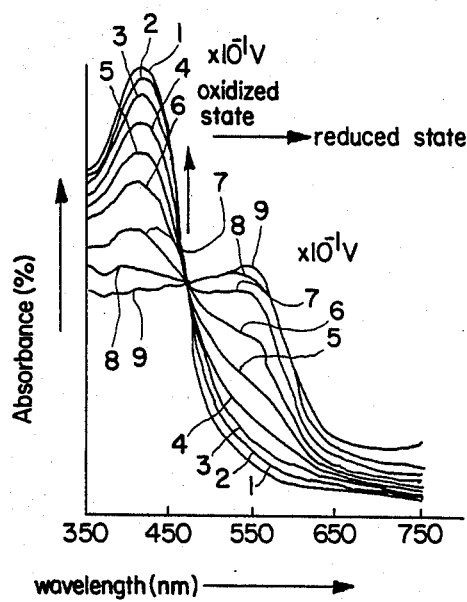

The relationships between the wavelength and absorbance are shown in FIGS. 2(a) and (b). FIG. 2(a) shows the relationship between the wavelength and absorbance when the state is changed from reduction to oxidation, and FIG. 2(b) is from oxidation to reduction.

Sample 1-2

The same procedure as for the preparation of Sample 1-1 was repeated except that tetrabutyl ammonium tetrafluoroborate was employed as a conductive salt, resulting in obtaining a laminate (Sample 1-2) of which red polymer film was formed on the surface of the ITO coated glass. The various properties of formed polymer film were measured similarly to Sample 1-1. The measured results are shown in Table 1, together with the properties of the material compound.

Sample 1-3

The same procedure as for the preparation of Sample 1-1 was repeated except that ethyl, 4-methyl pyrrole-3-carboxylate of 0.385 g ($2.5 \times 10^{-3}$ mole) was employed as 3,4-substituted pyrrole compound, resulting in obtaining a laminate (Sample 1-3) of which red polymer film was formed on the surface of the ITO coated glass.

The various properties of the polymer film were measured similarly to Sample 1-1. The measured results are shown in Table 1, together with the properties of the material compound.

Sample 1-4

The same procedure as for the preparation of Sample 1-1 was repeated except that octyl, 4-methyl pyrrole-3-carboxylate of 0.593 g ($2.5 \times 10^{-3}$ mole) was employed as a 3,4-substituted pyrrole compound, resulting in obtaining a laminate (Sample 1-4) of which brown polymer film was formed on the surface of the ITO coated glass. The various properties of the polymer film were measured similarly to Sample 1-1. The measured results are shown in Table 1, together with the properties of the material compound.

Sample 1-5

The same procedure as for the preparation of Sample 1-1 was repeated except that 4-methyl pyrrole-3-carboxylic acid of 0.313 ($2.5 \times 10^{-3}$ mole) was employed as a 3,4-substituted pyrrole compound, resulting in obtaining a laminate (Sample 1-5) of which reddish purple polymer film was formed on the surface of the ITO coated glass. The various properties of the polymer film were measured similarly to Sample 1-1. The measured results are shown in Table 1, together with the properties of the material compound.

Sample 1-6 to 1-9

The same procedures as for the preparation of Sample 1-1 were repeated except that a 3,4-asymmetrically substituted pyrrole compound whose combination of the substituents at $C_3$ and $C_4$ was different was employed as a material, resulting in obtaining laminates (Samples 1-6 to 1-9) of which various types of polymer film were formed on the surface of the ITO coated glass.

The various properties of the polymer films were measured similarly to Sample 1-1. The measured results are shown in Table 1, together with the properties of the material compounds.

The pyrrole compounds and their polymers of Samples 1-6 and 1-7 were measured for the IR absorption spectra by using FT-IR 20D (Nicolet Japan Co.) and by KBr tablet method. The measured IR absorption spectra are shown in FIGS. 3(a) and (b). An absorption based on the 2,5-H out-of-plane vibration is observed at 700–800 cm$^{-1}$ in the IR spectra of the monomers but disappear after polymerized. Thus it is confirmed that polymer of which $C_2$ and $C_5$ are bonded to form a chain is obtained.

Comparison sample 1-1

The same procedure as for the preparation of Sample 1-1 was repeated except that pyrrole (symmetrical and not substituted at $C_3$ and $C_4$) was employed as a pyrrole compound of a material, resulting in obtaining a laminate (Comparison sample 1-1) of which black polymer film was formed on the surface of the ITO coated glass.

The various proporties of both pyrrole of the material and the obtained polymer film were measured similarly to Sample 1-1.

The measured various properties of the polymer film are shown in Table 1, together with the properties of the material compound.

Comparison sample 1-2

The same procedure as for the preparation of Sample 1-1 was repeated except that 3-methyl pyrrole whose substituent at $C_3$ is a methyl radical ($\sigma p = -0.17$), an electron donative substituent, was employed as a pyrrole compound of a material, resulting in obtaining a laminate (Comparison sample 1-2) of which polymer film was formed on the surface of the ITO coated glass.

The various properties of the polymer film and the pyrrole compound were measured similarly to Sample 1-1.

The measured various properties of the polymer film are shown in Table 1, together with the properties of the material compound.

TABLE 1

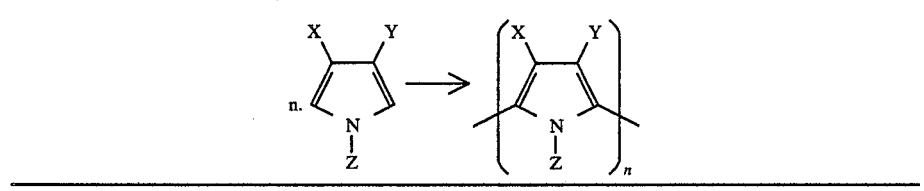

| Sample No. | Pyrrole compounds | | | | Oxidation Potential (V) |
|---|---|---|---|---|---|
| | Substituent | | | | |
| | X | Y*1 | Z | Conductive Salt | |
| 1-1 | $CH_3$ | $COOCH_3$ | H | $(C_4H_9)_4NClO_4$ | 1.1 |
| 1-2 | $CH_3$ | $COOCH_3$ | H | $(C_4H_9)_4NBF_4$ | 1.1 |
| 1-3 | $CH_3$ | $COOC_2H_5$ | H | $(C_4H_9)_4NClO_4$ | 1.1 |
| 1-4 | $CH_3$ | $COOC_8H_{17}$ | H | $(C_4H_9)_4NClO_4$ | 1.0 |
| 1-5 | $CH_3$ | $COOH$ | H | $(C_4H_9)_4NClO_4$ | 0.9 |
| 1-6 | $CH_3$ | $COC_2H_5$ | H | $(C_4H_9)_4NClO_4$ | 1.1 |
| 1-7 | $CH_3$ | $CN$ | H | $(C_4H_9)_4NClO_4$ | 1.45 |
| 1-8 | $C_3H_7$ | $COOC_2H_5$ | H | $(C_4H_9)_4NClO_4$ | 1.05 |
| 1-9 | $C_6H_5-CH_2$ | $COOCH_3$ | H | $(C_4H_9)_4NClO_4$ | 1.1 |
| Comparison | | | | | |
| 1-1 | H | H | H | $(C_4H_9)_4NClO_4$ | 0.8 |
| 1-2 | H | $CH_3$ | H | $(C_4H_9)_4NClO_4$ | 0.7 |

| | Pyrrole Compound Polymer Film | | | |
|---|---|---|---|---|
| | | Oxidation Reduction Potential | | |
| | | Anode Peak | Cathode Peak | Electrochromic Property |
| Sample | Conductivity | Voltage | Voltage | *2 *3 |

TABLE 1-continued $$\underset{n}{\underset{Z}{\underset{|}{N}}}\underset{}{\overset{X\quad Y}{\diagup\!\!\!\diagdown}} \longrightarrow \left(\underset{\underset{Z}{\underset{|}{N}}}{\overset{X\quad Y}{\diagup\!\!\!\diagdown}}\right)_n$$

| No. | (S cm$^{-1}$) | Epa: (mV) | Epc: (mV) | (nm) | (nm) | *4 |
|---|---|---|---|---|---|---|
| 1-1 | 1.0 × 10$^0$ | +820 | +500 | red: 530 | yellowish green: 406 | O |
| 1-2 | 0.5 × 10$^0$ | +820 | +500 | red: 530 | yellowish green: 406 | O |
| 1-3 | 1.2 × 10$^{-3}$ | +740 | +420 | red: 550 | yellowish green: 380 | O |
| 1-4 | 1.1 × 10$^{-4}$ | +850 | +600 | brown: 540 | yellowish green: 390 | O |
| 1-5 | 0.4 × 10$^0$ | +750 | +560 | reddish purple: 570 | yellow: 390 | O |
| 1-6 | 1.2 × 10$^{-3}$ | +840 | +500 | reddish purple: 550 | yellowish green: 380 | O |
| 1-7 | <10$^{-6}$ | +1200 | +650 | green: — | brown: — | O |
| 1-8 | 9.3 × 10$^{-5}$ | +1000 | +500 | reddish brown: — | yellowish green: — | O |
| 1-9 | — | +1050 | +750 | red: — | yellow: — | O |
| Comparison | | | | | | |
| 1-1 | 0.9 × 10$^2$ | +400 | +0 | black: — | yellowish green: 420 | X |
| 1-2 | — | +80 | +40 | — | — | X |

*$^1$Hammett's Substituent Constant COOCH$_3$; 0.46, COOC$_2$H$_5$; 0.46, COOC$_8$H$_{17}$; 0.46, COOH; 0.42, COC$_2$H$_5$; 0.45, CN; 0.66, H; 0, CH$_3$; −0.17
*Stability of electrochromic property
O: Capable of leaving stable in the air for a week in the oxidation state or reduction state.
X: Stable in the oxidation state, but, in the reduction state, impossible to leave because oxidized by the air.
*$^2$Color in Oxidation State: Max. Absorption Wavelength
*$^3$Color in Reduction State: Max. Absorbtion Wavelength
*$^4$Stability in air

EXAMPLE 2

Chemical oxidative polymerization
Sample 2-1

To 46 ml of acetonitrile solution containing 0.50 g of 4-methyl pyrrole-3-carboxylic acid and 1.38 g of tetraethyl ammonium-para toluene sulfonate was added 4.46 g of anhydrous ferric chloride, and the resulting solution was heated at the boiling point of acetonitrile (81.6° C.) for 13 hours.

After cooled, the solution was filtrated with No. 2 qualitative filter paper, washed with acetonitrile, and then heated to dry by an incandescent lamp to give 0.86 g of black product. Of it, 222 mg was pulverized in mortar, made contact with iodine vapor for 3 days, and then formed to be a disc of 10 mmφ in diameter and 1.87 mm thick by using a tablet forming machine for IR absorption spectrum sample. The disc was further made contact with iodine vapor for 3 days and its volume resistivity was measured by the 4 probe method according to Van der Pauw. The conductivity (S cm$^{-1}$) was 2.9×10$^{-4}$.

Sample 2-2

0.19 g of 4-phenyl pyrrole-3-carboxylic acid and 2.76 g of stannic chloride were dissolved in 30 ml of chloroform to heat to reflux at the boiling point of chloroform, 61.2° C., for 6 hours. After cooling, the resultng solution was filtrated. The residue on the surface of the filter paper was washed with chloroform and heated to dry by an incandescent lamp to give 220 mg of black product.

Of it, 186 mg was pulverized in a mortar and the conductivity (S cm$^{-1}$) was measured in a similar way to Sample 1-1. The result was 1.3×10$^{-4}$. (However the size of the formed disc was 10 mmφ in diameter×1.32 mm thick.)

EXAMPLE 3

Polymer soluble in alkaline aqueous solvent.
Sample 3-1

An ITO coated glass (4 cm$^2$) used as an anode, and platinum and KCl saturated calomel electrodes employed as a cathode and a reference electrode, respectively, were set in an electrolytic cell of 100 ml in capacity. Purified 4-methyl pyrrole-3-carboxylic acid of 6.25×10$^{-2}$ g and 1.71 g of (n-Bu)$_4$NClO$_4$ were dissolved in 50 ml of acetonitrile to use as an electrolyte, which was placed in the cell.

Both electrodes were dipped in the electrolyte so as to be immersed 20 mm depth from the lower side of the electrode. Nitrogen gas was introduced to remove dissolved oxygen and the air is shut down from mixing, then current of 2 mA was applied for 10 minutes.

Reddish purple polymer was electrodeposited on the ITO coated glass of the anode. The anode was pulled up from the electrolyte, washed with acetone and wind dried to give 1.34 mg of weight increase. This value is larger than the theoretical value:

$$(2 \text{ mA} \times 600 \text{ sec}/96485) \times \frac{125.13}{2} = 0.78 \text{ mg}$$

Because it is considered that the washing with acetone cannot remove the doped ClO$_4^-$ ions. The polymer, when immersed in 0.5 ml of 2N-NaOH aqueous solution, slowly dissolves to give a transparent greenish yellow solution. This solution was applied to a platinum wire of 1 mmφ×7 mm and made contact with hydrogen chloride gas, resulting in the recognition of black polymer formed on the surface the platinum wire. This platinum wire was employed as an anode, and a platinum wire was used as a cathode and an Ag/AgCl electrode as a reference electrode, and cyclic voltammetry was performed from −0.4 V to +1.9 V (vs Ag/AgCl) to give curves almost equal to the cyclic voltammograms directly obtained by the electrochemical polymerization using (n-Bu)$_4$NClO$_4$ as a supporting electrolyte and acetonitrile as a solvent.

The molecular weight of the obtained polymer was measured by GPC to give weight average molecular weight of approximately 2,800.

The molecular weight was measured under the conditions: high-speed liquid chromatography LC-6A (Shimadzu), column; Asahi pack GS-520 (Asahi Chemical Industry, vinyl alcohol copolymer) of 7.6 mm$\phi$×500 mm, developing solution; sodium phosphate system, a buffer of pH 11.4, and at room temperature. The detection was carried out at the wavelength of 250 nm and the molecular weight was calculated by using polystyrene sodium sulfonate as a standard polymer substance.

Sample 3-2

Equipment similar to that used for Sample 3-1 was used, an acetonitrile solution containing 0.01 mole/l of 4-propyl pyrrole-3-carboxylic acid and 0.1 mole/l of (n-Bu)$_4$NBF$_4$ was employed as an electrolyte, and a current was applied intermittently at 6 mA×60 sec×11 times to form 1.38 g of polymer on the anode plate. When the electrode coated with this polymer was immersed in a 1/20 N NaOH aqueous solution, the polymer was immediately peeled off from the electrode plate and slowly dissolved to give a transparent dark greenish yellow solution.

The molecular weight of the obtained polymer was measured by GPC to give weight average molecular weight of approximately 5,000.

Sample 3-3

The same experiment as for the preparation of sample 3-1 were repeated except that an acetonitrile solution containing 0.1 moles of 4-phenyl pyrrole-3-carboxylic acid and 0.1 mole/l of (n-Bu)$_4$NClO$_4$ was employed as an electrolyte. A current of 6 mA was continuously applied for 600 seconds to give 2.2 mg of polymer on the anode plate. When this anode plate was dipped in a mixture solution of 10 ml of 2N-NaOH aqueous solution and 5 ml of ethanol, a green solution, in which most of the polymer were dissolved but black fine particles were partly suspended, was obtained. The solution was filtrated with filter paper to give a transparent solution.

The molecular weight of the obtained polymer was measured by GPC to give average molecular weight of approximately 3,500.

Sample 3-4

2 mg of the polymer of Example 2 (Sample 2-1) obtained by the chemical oxidative polymerization were dissolved in 5 ml of 2N-NaOH aqueous solution and turned blackish green. The resulting solution was filtrated with 0.4$\mu$ micron filter and the molecular weight was measured by GPC to give weight average molecular weight of approximately 2,800.

Similarly, 2 mg of the polymer of Example 2 (Sample 2-2) dissolved in a mixture solution of 5 ml of 2N NaOH and 10 ml of ethanol and turned blackish green.

Industrial Applicability

The polymers of pyrrole compounds of which at least one of C$_3$ and C$_4$ is substituted by an electron attractive group, particularly pyrrole compounds of which only one of C$_3$ and C$_4$ is substituted, have oxidation reduction potential different from that of oxygen and water, compared with the polymers described in the aforementioned comparison examples, and exist stable in the air in the undoping state.

The polymers of this invention, as shown in FIG. 2, have a continuous clear visible light absorption spectrum against the voltage change, and the spectra show almost completely reversible behavior between the oxidation and reduction states. This means, the polymers of this invention have clear electrochromism characeristics.

In addition, the polymers soluble in alkaline aqueous solvent have the advantage that conductor film with a desired pattern can be formed on the surface of a desired substrate.

Thanks to the above facts, these polymers used as laminates of which polymer film is formed on an electrode plate, have expectation of the applications to optical functional components such as electrochromic displays, optical switches and optical memory components, and for the use as materials for a variety of electronic devices such as sensor materials and battery materials.

The applications as agents such as polymer electrolytes or polymer chelating agents are also expected.

What is claimed is:

1. New polymers of 3,4-substituted pyrrole compounds, which are represented by the general formula:

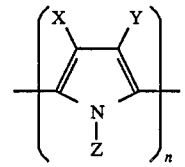

where at least one of X and Y is an electron attractive substituent with 0.03–0.80 of Hammett's substituent constant ($\sigma$p), if only either X or Y is the above electron attractive substituent, the other one is hydrogen, an alkyl radical, a benzyl radical or a non-substituted or a phenyl radical substituted by a halogen, nitro, cyano methoxy or ethoxy radical; Z is hydrogen or a lower alkyl radical; and n is an integer of 2 or larger.

2. New polymers according to claim 1 in which either X or Y is an electron attractive substituent with 0.3–80 of Hammett's substituent constant ($\sigma$p) and the other is hydrogen, an alkyl radical, a benzyl radical or a non-substituted or phenyl radical substituted by a halogen, nitro, cyano, methoxy or ethoxy radical.

3. New polymers according to claim 1 or 2 in which the electron attractive substituent is —COOH, —COOR, —NO$_2$, —CN, —COR, —CONH$_2$ or —CONHOH, where R is a straight-chain or branched alkyl radical having from 1 to 10 carbon atoms.

4. New polymers according to claim 1 or 2 in which the repeated unit the polymers have is a 3,4-substituted pyrrole compound and of which at least one of X and Y is —COOH or —CH$_2$COOH and if only either X or Y is —COOH or —CH$_2$COOH, the other is hydrogen, an alkyl radical having from 1 to 3 carbon atoms or a phenyl radical, and the weight average molecular weight, Mw is 1,000 to 1,000,000 wherein the polymers are soluble in alkaline aqueous solvent.

* * * * *